United States Patent
Graves

[11] Patent Number: 5,938,331
[45] Date of Patent: Aug. 17, 1999

[54] AUTOMATIC STIRRING APPARATUS

[76] Inventor: Mitchell Bartel Graves, 1950 248th St., Lomita, Calif. 90717

[21] Appl. No.: 09/040,137

[22] Filed: Mar. 17, 1998

[51] Int. Cl.[6] .............................. B01F 7/18; A47J 43/044; A47J 43/046
[52] U.S. Cl. .............................. 366/244; 366/314; 99/348
[58] Field of Search .......................... 366/197, 242–251, 366/314, 325.1; 99/348

[56] References Cited

U.S. PATENT DOCUMENTS

| | | | |
|---|---|---|---|
| D. 341,291 | 11/1993 | Dow, III | D7/354 |
| 2,700,534 | 1/1955 | Pegues | 366/251 |
| 3,005,399 | 10/1961 | Libson | 99/348 |
| 3,357,685 | 12/1967 | Stephens | 99/348 |
| 4,151,792 | 5/1979 | Nearhood | 99/348 |
| 4,575,255 | 5/1986 | Kafka | 366/129 |
| 4,921,356 | 5/1990 | Bordenga | 366/343 |
| 5,013,158 | 5/1991 | Tarlow | 366/251 |
| 5,271,673 | 12/1993 | Bohnet et al. | 366/245 |
| 5,332,310 | 7/1994 | Wells | 366/129 |
| 5,372,422 | 12/1994 | Dubroy | 366/143 |
| 5,613,425 | 3/1997 | Krznaric | 366/249 |
| 5,765,947 | 6/1998 | Dubroy | 366/249 |

*Primary Examiner*—Charles E. Cooley
*Attorney, Agent, or Firm*—Goldstein & Canino

[57] ABSTRACT

An automatic stirring apparatus for stirring food materials which are contained within a kitchen cooking implement such as a pot. The device comprises a telescoping housing having motor driven rotating wheels extending outward from each end. A plurality of elongated stirring wands extend from the housing. The housing is placed upon the bottom of a pot or upon the top lip of the side wall. Upon activation of the motor, the rotating wheels abut a wall of the pot and cause the housing to rotate, thus pulling the elongated stirring wands through the food material in a stirring motion.

8 Claims, 2 Drawing Sheets

5,938,331

AUTOMATIC STIRRING APPARATUS

FIELD OF THE INVENTION

The invention relates to an automatic stirring apparatus. More particularly, the invention relates to an apparatus for use in an unattended pot, saucepan, bowl or similar kitchen implement containing foodstuffs which require constant stirring during cooking to prevent coagulation, burning and adhesion of the foodstuff to the bottom and walls of the kitchen implement.

BACKGROUND OF THE INVENTION

The food service industry, as well as homemakers and novice chefs, often encounter difficulty in preparing sauces, soups and similar semi-viscous foodstuffs. Typically, such foodstuffs must be prepared in large pots or saucepans and require frequent stirring and mixing to ensure uniform cooking and to prevent the food stuff from coagulating, burning or adhering to the walls of the pot or saucepan. This task often proves daunting and frustrating for the food preparer in that he or she may also be busy with numerous other time consuming tasks and unable to periodically attend to the pot or saucepan for the requisite stirring or mixing. As a result, the consistency and quality of the foodstuffs present in the pot or saucepan may be seriously degraded due to a lack of proper stirring/mixing.

There have been numerous attempts in the prior art to provide automatic stirrers which are adaptable to various kitchen pots and pans containing semi-viscous foodstuffs therein. Most of these devices prove extremely intricate and expensive to manufacture, however, and tend to be very inflexible with regards to their ability to be adapted to kitchen implements such as saucepans and stock-pots which are of unusual sizes.

One such device found in the prior art is U.S. Pat. No. 4,921,356 to Bordenga. This reference discloses a complex automatic stirrer having a number of legs which must be configured to fit the intended pot or saucepan. The device also employs an elongated shaft having a stirring paddle and optional stirring basket assembly attached at the end thereof. While accomplishing the task of stirring, the device nevertheless is bulky and awkward, proving cumbersome to install. U.S. Pat. No. 5,332,310 to Wells discloses a device similar in complexity. The Wells device, not unlike the Bordenga device, is extremely complicated and arduous to install. Furthermore, both devices and others like them in the prior art require the device central housing to be fixedly installed to the pot or saucepan at the lip, while a stirring paddle or similar agitating device extends downward into the material to be stirred. This arrangement of a distinct housing/stirring mechanism and it's required securement to the pot or saucepan results in these apparatus being very cumbersome to employ. A device is needed such as that of the instant invention which is simply placed upon the intended pot or saucepan and instantly begins stirring.

While these prior art units may be suitable for the particular purpose employed, or for general use, they would not be as suitable for the purposes of the present invention as disclosed hereafter.

SUMMARY OF THE INVENTION

The present invention relates to an apparatus for use in an unattended pot, saucepan, bowl or similar kitchen implement containing foodstuffs which require constant stirring during cooking to prevent coagulation, burning and adhesion of the foodstuff to the bottom and walls of the kitchen implement.

In accordance with the invention, there is provided an automatic stirring apparatus which can be adapted to fit a large variety of pots, saucepans, bowls and similar kitchen cooking implements.

Further in accordance with the invention, there is provided an automatic stirring apparatus which prevents food products contained within a pot or similar cooking receptacle from burning or coagulating, thus greatly improving the food's flavor and consistency.

Further in accordance with the invention, there is provided an automatic stirring apparatus which is quickly and easily secured to the intended pot, saucepan or similar receptacle.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
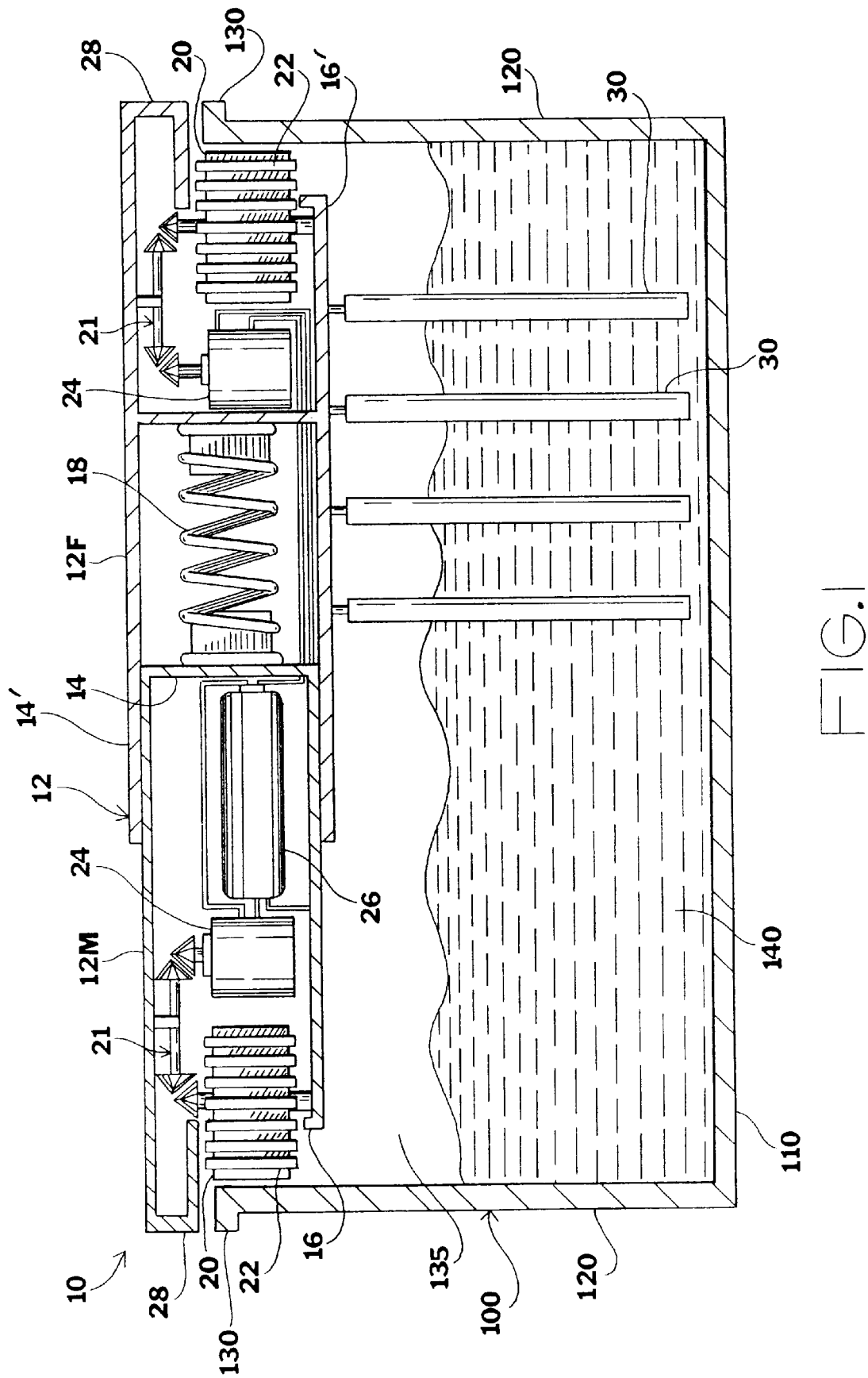
FIG. 1 is a partial cross sectional view of the instant invention with parts removed to more clearly illustrate internal elements thereof.

Certain terminology is used in the following description for convenience only and is not limiting. The words "right," "left," "lower" and "upper" designate directions in the drawings to which reference is made. The words "inwardly" and "outwardly" refer to directions toward and away from, respectively, the geometric center of an automatic stirring apparatus of the instant invention. The words "proximal end" and "distal end" refer, respectively, to ends of an object nearer to and further from the operator of the object when the object is used in a normal fashion or as is described in the specification.

FIG. 1 illustrates a partial cross sectional view of an automatic stirring apparatus 10 of the instant invention. The apparatus 10 is shown installed upon a kitchen cooking implement 100 which will hereafter be referred to as a pot 100. The pot 100 as shown comprises a round pot bottom 110 and circumferential pot wall 120 which surrounds the pot bottom 110 and extends upward perpendicular therefrom. A lip 130 is disposed about the entire top edge of the pot wall 120. The pot bottom 110 and pot wall 120 defines a pot interior 135. Such pots 100 are well known in the prior art and to those skilled in the art. A semi-viscous food material 140 is contained within the pot interior 135 as can be seen clearly in FIG. 1.

The automatic stirring apparatus 10 comprises a telescoping housing 12 which consists of a male housing member 12M and female housing member 12F. The male housing member 12M has a closed inner end 14 and an opposite closed outer end 16. The female housing member 12F similarly has a closed outer end 16' but an open inner end 14' which accepts the closed inner end 14 of the male housing member 12M. Accordingly, the male housing member 12M is slideably retained within the open inner end 14' of the female housing member 12F. Biasing means such as a spring 18 are contained within the female housing member 12F and urge the closed inner end 14 of the male housing member 12M outward. Accordingly, the telescoping housing 12 as a whole is constantly attempting to achieve it's longest length, for reasons which will be discussed below.

A rotating wheel 20 extends out of the closed outer end 16 of the male housing member 12M and the closed outer end 16' of the female housing member 12F. Each wheel 20 rotates about a generally vertical axis and has a series of traction treads 22 disposed about the periphery thereof, and it is contemplated that said wheel 20 consist of a thick rubber, plastic or similar material having superior traction qualities. At least one electrical motor unit 24 is located within the telescoping housing 12 and transmits rotational energy to the rotating wheel 20 through a transmission assembly 21. The electrical motor units 24 are in circuit with a power source 26, preferably a rechargeable battery.

The automatic stirring apparatus 10 may comprise several embodiments, and thus be used in several manners. In the embodiment depicted in FIG. 1, the telescoping housing 12 possesses flanges 28 at the closed outer ends 16 and 16' directly above the rotating wheels 20. Use of the apparatus entails compressing the telescoping housing 12 and placing it within the pot interior 135 so that the rotating wheels 20 are biased by spring 18 into abutting contact with opposite sides of the pot wall 120, and the flanges 28 rest on top of the pot lip 130. Accordingly, the automatic stirring apparatus 10 is supported above the top of the pot 100. A plurality of elongated stirring wands 30 extend downward from the housing 12 into the pot interior 135 until immersed in the food material 140 contained therein. When the electric motor units 24 are activated and the rotating wheels 20 thus caused to turn against the pot wall 120, the entire housing 12 is caused to rotate above the pot 100 with the flanges 28 resting on top of the pot lip 130. The elongated stirring wands 30 which extend downward from the housing 12 into the food material 140 are thus caused to agitate and stir the food material 140 within the pot interior 135.

Figure 2:
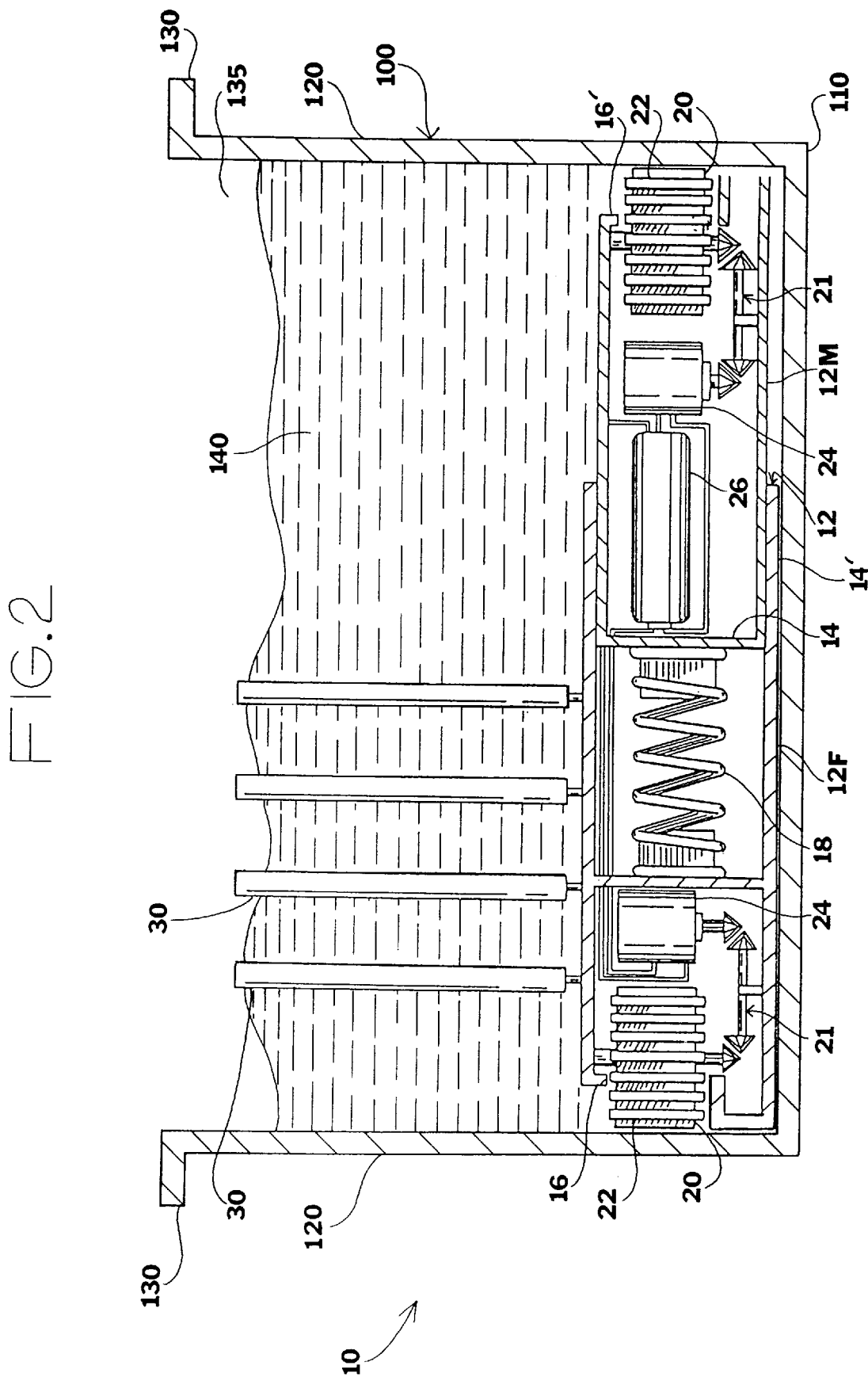
FIG. 2 is a diagrammatic perspective view of the instant invention being employed within a kitchen cooking implement.

A second embodiment of the automatic stirring apparatus 10 can be seen in FIG. 2. Thereat, it is illustrated that the housing 12 lacks flanges 28 at the closed outer ends 16 and 16'. It is contemplated that the second embodiment of the automatic stirring apparatus 10 be completely immersed in the food material 140 which is contained within the pot interior 135 so that the housing 12 lies on the pot bottom 110 with the elongated stirring wands 30 extending upward. When the electric motor units 24 are activated and the rotating wheels 20 thus caused to turn against the pot wall 120, the entire housing 12 is caused to rotate along the pot bottom 110, causing the upward extending elongated stirring wands 30 to stir the food material 140. It should be understood that this immersible embodiment of the automatic stirring apparatus 10 should be configured so that the housing 12 is sealed tightly at all potential openings, thus preventing any food material 140 from penetrating said housing 12 and destroying the interior electronics and/or mechanical parts.

What is claimed is:

1. An automatic stirring apparatus for stirring food materials which are contained within one of a kitchen cooking implement or a pot, the pot comprising a round pot bottom which is surrounded by a perpendicular upstanding pot wall having a lip along the top edge, the pot wall and pot bottom defining a pot interior which contains the food materials, comprising:

a) a telescoping housing consisting of a male housing member and a female housing member, the male housing member having a closed inner end and an opposite closed outer end, the female housing member having a closed outer end and an open inner end which accepts the closed inner end of the male housing member so that said male housing member is slideably retained within the open inner end of the female housing member;

b) biasing means contained within the female housing member which urge the closed inner end of the male housing outward away from the closed outer end of the female housing member, thus causing the housing to constantly urge itself to extend to its longest length;

c) at least one electrical motor unit within the telescoping housing, the electrical motor unit in electrical circuit with a power source which is also contained within the telescoping housing;

d) two opposed rotating wheels, one extending out of each of the closed outer ends of the telescoping housing, each of said wheels having a plurality of traction treads disposed about its periphery;

e) a transmission assembly extending between the electrical motor unit and at least one of the rotating wheels, said transmission assembly capable of transmitting rotational energy from the activated electrical motor unit to the connected rotating wheel;

f) a flange located above the rotating wheel at each of the closed ends of the telescoping housing; and g) a plurality of elongated stirring wands extending downward from the telescoping housing opposite the flanges, whereby the apparatus is employed by immersing said stirring wands within the food materials contained within the pot interior and the rotating wheels are caused to abut opposite sides of the pot wall while the flanges rest on top of the pot lip so that the automatic stirring apparatus is supported above the top of the pot and when the at least one electrical motor unit is activated and the rotating wheels thus caused to turn against the pot wall, the entire housing is caused to rotate above the pot with the flanges resting on top of the pot lip, and the elongated stirring wands are thus caused to agitate and stir the food materials.

2. The automatic stirring apparatus of claim one, wherein the biasing means comprise a spring.

3. The automatic stirring apparatus of claim two, wherein the rotating wheels consist of a soft rubber.

4. The automatic stirring apparatus of claim three, wherein the power source comprises a battery.

5. An automatic stirring apparatus for stirring food materials which are contained within one of a kitchen cooking implement or a pot, the pot comprising a round pot bottom which is surrounded by a perpendicular upstanding pot wall which defines a pot interior which contains the food materials, comprising:

a) a telescoping housing consisting of a male housing member and a female housing member, the male housing member having a closed inner end and an opposite closed outer end, the female housing member having a closed outer end and an open inner end which accepts the closed inner end of the male housing member so that said male housing member is slideably retained within the open inner end of the female housing member;

b) biasing means contained within the female housing member which urge the closed inner end of the male housing outward away from the closed outer end of the female housing member, thus causing the housing to constantly urge itself to extend to its longest length;

c) at least one electrical motor unit within the telescoping housing, the electrical motor unit in electrical circuit with a power source which is also contained within the telescoping housing;

d) two opposed rotating wheels, one extending out of each of the closed outer ends of the telescoping housing, each of said wheels having a plurality of traction treads disposed about its periphery;

e) a transmission assembly extending between the electrical motor unit and at least one of the rotating wheels, said transmission assembly capable of transmitting rotational energy from the activated electrical motor unit to the connected rotating wheel;

f) a plurality of elongated stirring wands extending from the telescoping housing, whereby the apparatus is employed by immersing the telescoping housing within the food materials contained within the pot interior and upon the pot bottom with the stirring wands extending upward, the rotating wheels are caused to abut opposite sides of the pot wall such that when the at least one electrical motor unit is activated and the rotating wheels caused to turn against the pot wall, the entire housing is caused to rotate along the pot bottom causing the elongated stirring wands to stir the food materials.

6. The automatic stirring apparatus of claim five, wherein the biasing means comprise a spring.

7. The automatic stirring apparatus of claim six, wherein the rotating wheels consist of a soft rubber.

8. The automatic stirring apparatus of claim seven, wherein the power source comprises a battery.

* * * * *